(12) United States Patent
Foisie et al.

(10) Patent No.: US 11,344,016 B1
(45) Date of Patent: May 31, 2022

(54) STORAGE CASE FOR PRESERVING FISHING RODS AND REELS

(71) Applicants: Samuel R. Foisie, Fort Myers, FL (US); Christopher T. Gorski, Dallas, TX (US)

(72) Inventors: Samuel R. Foisie, Fort Myers, FL (US); Christopher T. Gorski, Dallas, TX (US)

(*) Notice: Subject to any disclaimer, the term of this patent is extended or adjusted under 35 U.S.C. 154(b) by 279 days.

(21) Appl. No.: 16/696,084

(22) Filed: Nov. 26, 2019

(51) Int. Cl.
*A01K 97/08* (2006.01)
*A47B 81/00* (2006.01)

(52) U.S. Cl.
CPC ............ *A01K 97/08* (2013.01); *A47B 81/005* (2013.01)

(58) Field of Classification Search
CPC ...... A47B 81/005; A47B 81/00; A01K 97/08; A01K 97/06; A01K 97/10
See application file for complete search history.

(56) References Cited

U.S. PATENT DOCUMENTS

| | | | |
|---|---|---|---|
| 4,309,065 A * | 1/1982 | Pappas | F41C 33/0209 312/242 |
| 5,444,984 A | 8/1995 | Carson | |
| 5,546,678 A | 8/1996 | Dhaemers | |
| 8,526,799 B2 * | 9/2013 | Peet | F24H 3/002 392/350 |
| 2003/0192196 A1 | 10/2003 | Bae | |
| 2005/0194872 A1 * | 9/2005 | Cleveland | A47B 81/005 312/290 |
| 2008/0060211 A1 | 3/2008 | Paradis et al. | |
| 2008/0256826 A1 | 10/2008 | Zarembinski | |

* cited by examiner

*Primary Examiner* — Timothy D Collins
*Assistant Examiner* — Maria E Graber
(74) *Attorney, Agent, or Firm* — Dinsmore & Shohl LLP; Luca L. Hickman

(57) ABSTRACT

A storage case (1) for storing fishing rods (2) and reels (3) in a dry controlled atmosphere to prevent rust, corrosion and mildew from forming on the fishing rods (2) and reels (3) stored therein.

15 Claims, 3 Drawing Sheets

STORAGE CASE FOR PRESERVING FISHING RODS AND REELS

FIELD OF THE INVENTION

This invention relates to fishing rods and reels and more particularly to a storage case for maintaining fishing rods and reels in a controlled dry atmosphere to prevent rust, corrosion and mildew from forming on the fishing rods and reels while being stored.

BACKGROUND OF THE INVENTION

Proper maintenance of fishing gear is essential to ensure gear, including rods and reels, remains in proper working order. A problem for many anglers is preventing rust and corrosion from forming on fishing rods and reels. If rods and reels are not properly cleaned immediately after use, then corrosion and rust can form. After cleaning and rinsing, the rods and reels must be actively dried and then stored, e.g., by using a hand towel.

Fans may sometimes be used to dry fishing gear by actively pushing air across the fishing gear, thereby speeding up the drying process. The fishing gear is then usually stored in a garage or similar non-climate controlled area where the fishing gear is exposed to outdoor air. This can pose a problem, especially in humid environments wherein constant exposure to humid air can promote formation of rust and corrosion on metal parts of a rod and reel and can also promote growth of mold and mildew on foam grips and other porous surfaces. As is commonly known, fishing rods and reels get wet when in use. In particular, saltwater fishermen often wash down fishing rods and reels with fresh water after use. While this removes the salt from the equipment, the equipment still oxidizes from the exposure to the fresh water.

Therefore, a need exists for a storage case for maintaining fishing rods and reels in a controlled dry atmosphere to prevent rust, corrosion and mildew from forming on the fishing rods and reels while being stored.

SUMMARY OF THE INVENTION

The primary object of the present invention is to extend the lifetime of fishing rods and reels by providing a storage case for maintaining fishing rods and reels in a controlled dry atmosphere to prevent rust, corrosion and mildew from forming on the fishing rods and reels while being stored.

The present invention fulfills the above and other objects by providing a storage case having a bottom panel, top panel, side walls, a rear wall and a front wall all forming a housing. Portions of the top panel and front wall form a removable cover to provide access to an interior space of the housing. The cover engages the rest of the housing via at least one gasket that prevents the passage of air into and out of the interior space of the housing.

A rear edge of the cover and a fixed edge of the top panel each preferably have wave patterns or C-shaped cutouts that engage each other when the cover is closed to form apertures spaced apart across the top panel. Each aperture is capable of encircling an upper portion of a strung or unstrung fishing rod while a lower portion of the fishing rod and reel mounted thereon are sealed in the housing. In other words, a generally air tight seal around the fishing rods is formed when the storage case cover is closed—better facilitating the rapid drying of the fishing rods by the dehumidifier. The at least one gasket forms a seal between the upper portion of each rod to prevent the passage of air.

A dehumidifier is located within the housing to remove moisture from the air trapped within the housing, thereby maintaining a dry environment that prevents rust, corrosion and mildew from forming on the fishing rods and reels stored in the housing. This dry air environment promotes the rapid-drying of wet fishing rods and reels which are placed into the storage case—thereby rapidly drying same. In the preferred embodiment, the dehumidifier is an active dehumidifier, i.e., one in which the residual moisture present on the fishing rods and reels is readily dried by an electrical device that extracts humidity from the air and stores the resultant collected condensation in a water collection system such as a reservoir. This water collection system can then be periodically drained by the user.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 2:
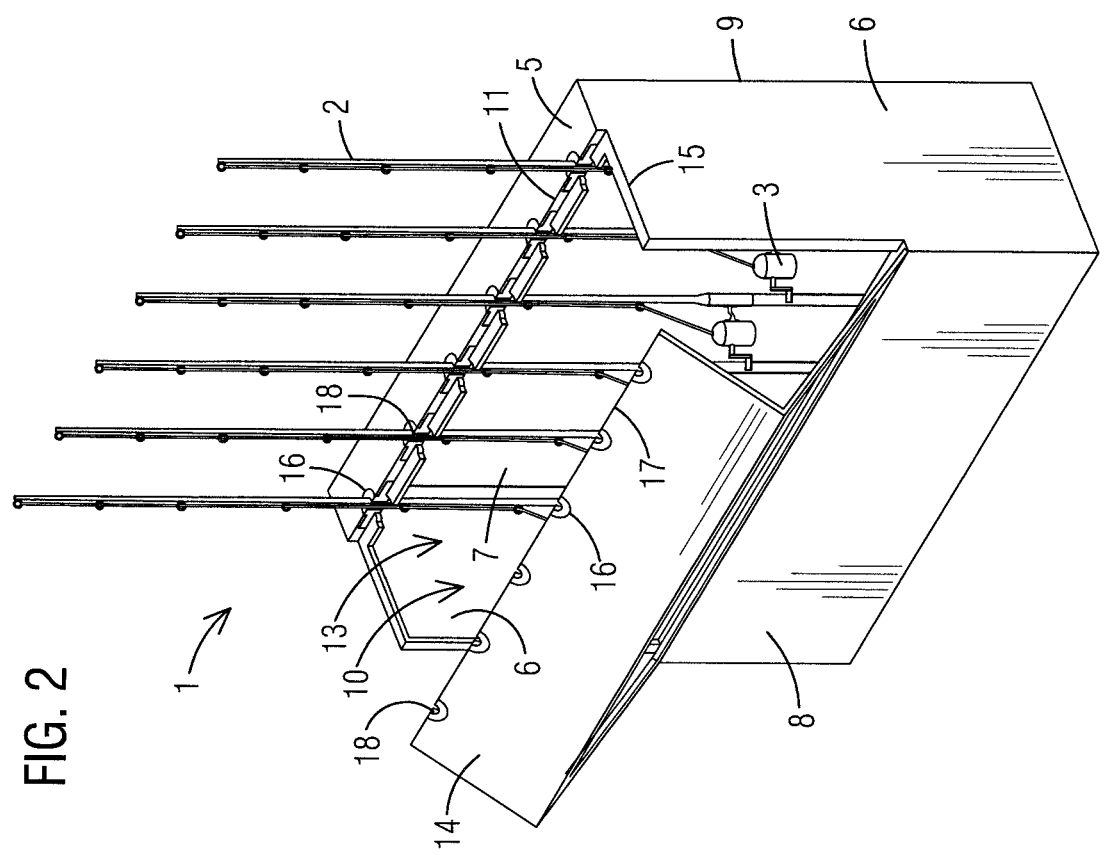
FIG. 2 is a front perspective view of a case of the present invention for storing and preserving fishing rods and reels in an open position and in use.

For purposes of describing the preferred embodiment, the terminology used in reference to the numbered accessories in the drawings is as follows:

1. storage case, generally
2. fishing rod
3. fishing reel
4. bottom panel
5. top panel
6. side wall
7. rear wall
8. front wall
9. housing 10. opening
11. front edge of top panel
12. top edge of front wall
13. interior space of housing
14. cover
15. top edge of side wall
16. gasket
17. rear edge of cover
18. cutout
19. aperture
20. window
21. dehumidifier
22. water collection system With reference to FIG. 1-7, views of a storage case 1 of the present invention for storing and preserving fishing rods 2 and reels 3 in open and closed positions are illustrated. The storage case 1 comprises a bottom panel 4, top panel 5, side walls 6, a rear wall 7 and a front wall 8 all forming a housing 9. An opening 10 is preferably formed between a front edge 11 of the top panel 5 and a top edge 12 of the front wall 8. The opening 10 provides access to an interior space 13 of the housing 9.

Figure 4:
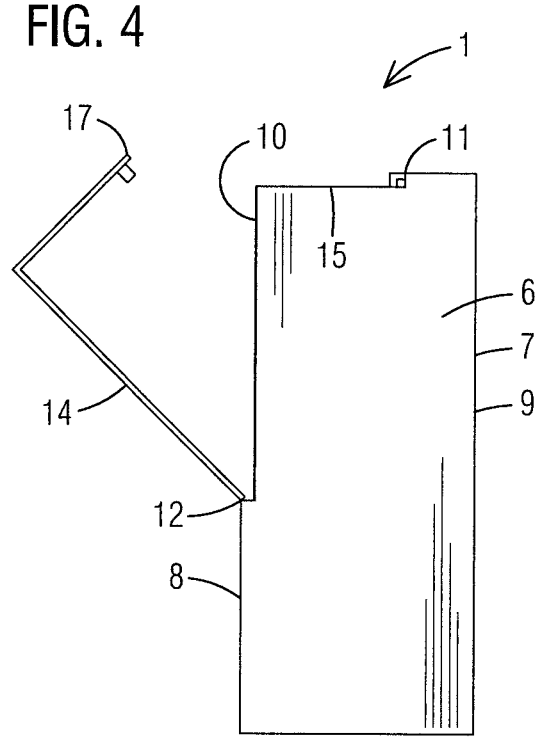
FIG. 4 is a side view of a case of the present invention for storing and preserving fishing rods and reels in an open position.
Figure 5:
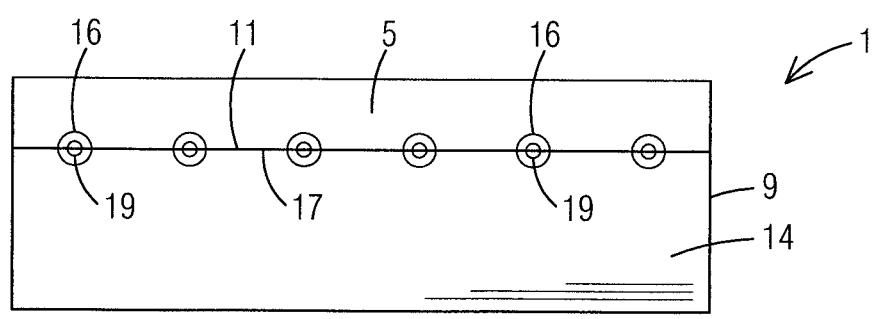
FIG. 5 is a top view of a case of the present invention for storing and preserving fishing rods and reels in a closed position.
Figure 6:
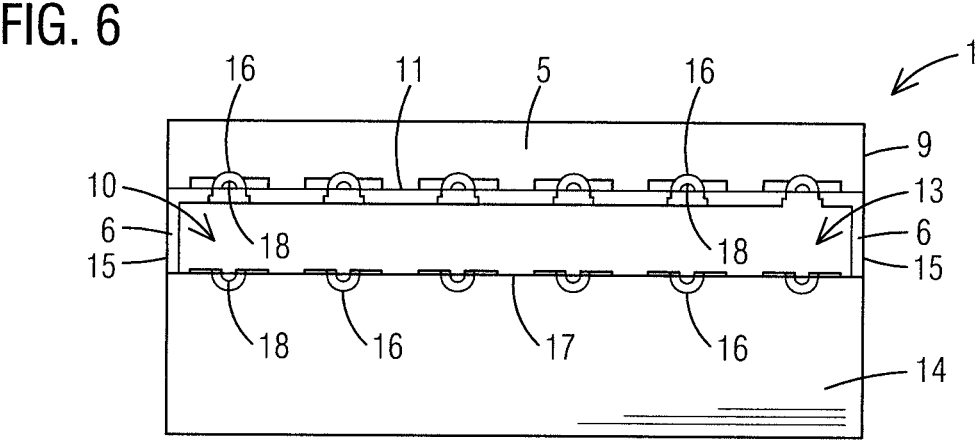
FIG. 6 is a top view of a case of the present invention for storing and preserving fishing rods and reels in an open position.
Figure 7:
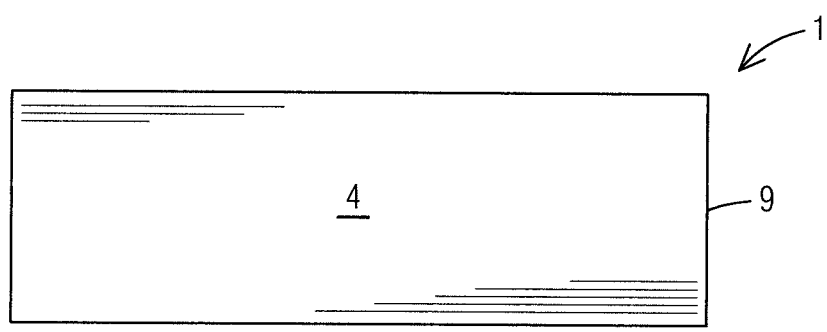
FIG. 7 is a bottom view of a case of the present invention for storing and preserving fishing rods and reels in a closed position.

A cover 14 seals the opening 10 by engaging the front edge 11 of the top panel 5, the top edge 12 of the front wall 8, and top edges 15 of the side walls 6. The cover 14 is preferably L-shaped from a side profile, as illustrated in FIG. 4, and hingedly attached to the top edge 12 of the front wall 8 to allow for easy placement and retrieval of fishing rods 2 and reels 3 from the storage case 1. At least one gasket 16, such as foam, rubber, plastic, one or more magnets and so forth, mates surfaces between the cover 14 and the housing 9 when the cover 14 is in a closed position to prevent the passage of air.

Figure 1:
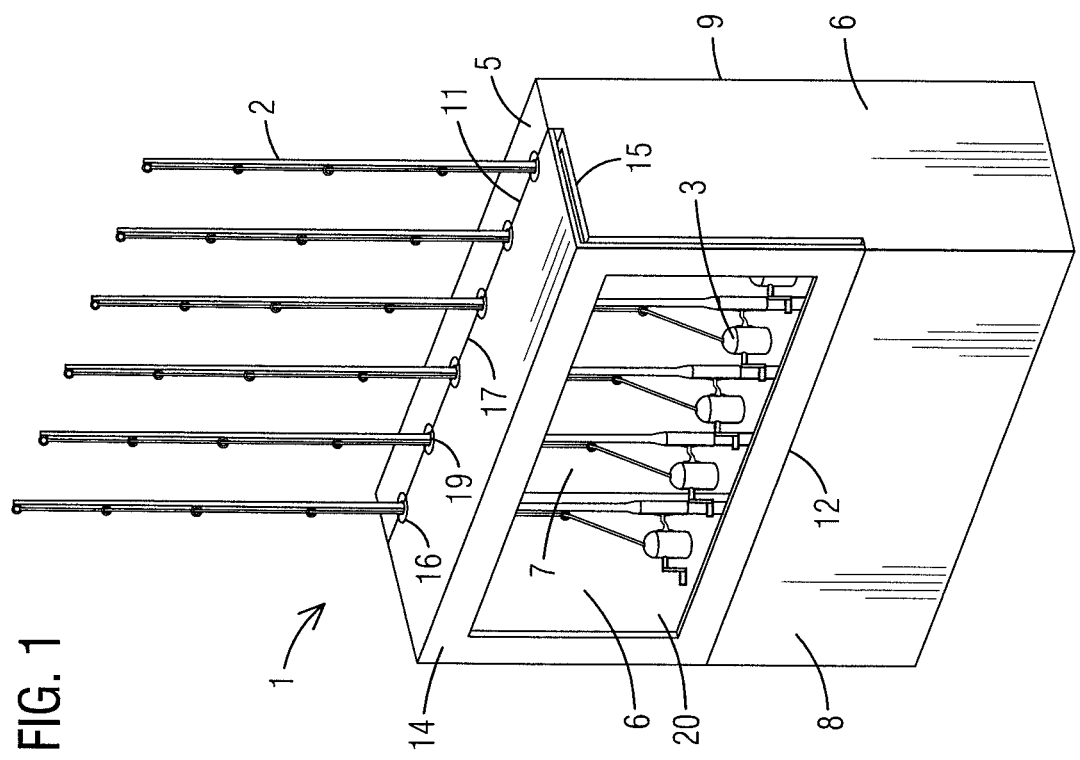
FIG. 1 is a front perspective view of a case of the present invention for storing and preserving fishing rods and reels in a closed position and in use.
Figure 3:
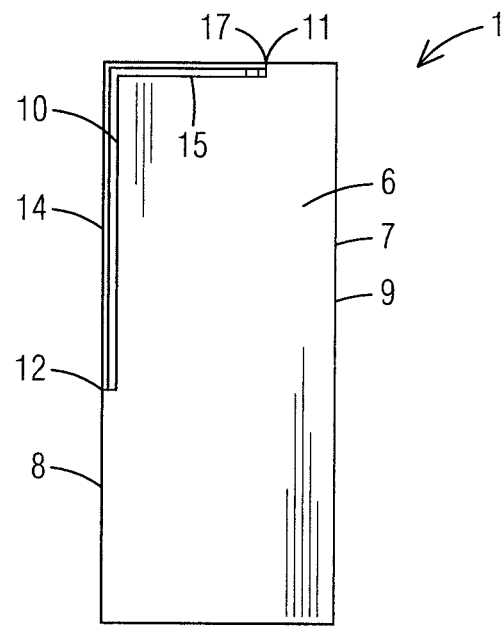
FIG. 3 is a side view of a case of the present invention for storing and preserving fishing rods and reels in a closed position.

A rear edge 17 of the cover 14 and the front edge 11 of the top panel 5 each preferably have complimentary patterns or cutouts 18 located thereon, such as C-shaped cutouts, rectangular-shaped cutouts and so forth, wherein the cutouts 18 engage each other when the cover 14 is closed to form apertures 19 spaced along between rear edge 17 of the cover 14 and the front edge 11 of the top panel 5. Each aperture 19 is capable of encircling an upper portion of fishing rod 2 while a lower portion of the fishing rod 2 and reel 3 mounted thereon are sealed in the housing 9, as illustrated in FIGS. 1 and 2. At least one gasket 16, such as a foam, is located between rear edge 17 of the cover 13 and the front edge 11 of the top panel 5 to form a seal around an upper portion of each rod 2 stored in the case 1 to prevent passage of air. A display window 20 may be located on case 1 to allow a user to inspect the fishing rods 2 and reels 3 stored in the case 1 without opening the housing 9 and allowing humidity and moisture into the case 1.

Figure 8:
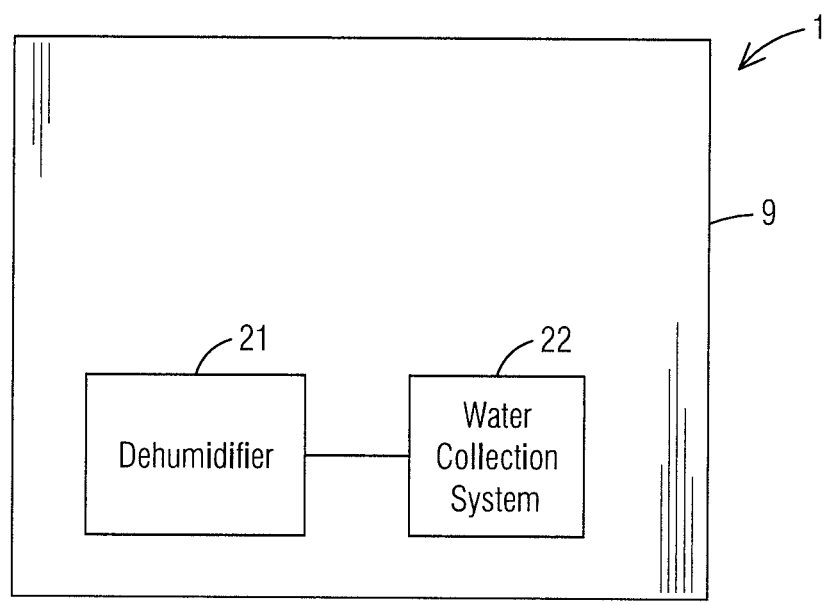
FIG. 8 is a block diagram showing components of a case of the present invention for storing and preserving fishing rods and reels.

With reference to FIG. 8, a block diagram showing components of a storage case 1 of the present invention for storing and preserving fishing rods 2 and reels 3 is illustrated. A dehumidifier 21 is located within the housing 9 to remove moisture from air trapped within the housing 8 when the cover 13 is in a closed position, thereby maintaining a dry environment within the housing 13. The dehumidifier 21 may comprise an absorbent material placed within said housing 9 and/or an electrical device that extracts humidity from the air. The dehumidifier 21 may be in fluid communication with an exterior of the housing 13 to transfer moisture trapped inside the housing 14 to outside of the housing 13 or other water collection system 22, such as a reservoir. In the preferred embodiment, the active dehumidification provided by the electrical dehumidifier rapidly dries any water on the surface of rods and reels stored therein—extending the life of such equipment.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A storage case for preserving fishing rods and reels comprising: (a) a bottom panel, a top panel, side walls, a rear wall and a front wall forming a housing; (b) an opening formed between a front edge of the top panel and a top edge of the front wall; (c) said opening providing access to an interior space of the housing; (d) a cover that engages said housing to seal said opening; (e) an active dehumidifier located within said housing, said dehumidifier in fluid communication with a water collection system; and (f) at least one aperture located between the cover and the top panel to allow an upper portion of a fishing rod to extend out of the housing while a lower portion of the fishing rod remains sealed within the housing when the cover is in a closed position with a substantially air-tight seal between the fishing rod and the cover.

2. The storage case of claim 1 further comprising:
at least one gasket located between the cover and the housing.

3. The storage case of claim 1 wherein: said cover is L-shaped.

4. The storage case of claim 1 wherein:
said cover is hingedly attached to said top edge of the front wall.

5. The storage case of claim 1 wherein:
said at least one aperture is formed by a cutout located on a front edge of said top panel and a corresponding cutout located on a rear edge of said cover.

6. The storage case of claim 5 further comprising:
at least one gasket located between said cutout located on said front edge of said top panel and said corresponding cutout located on said rear edge of said cover.

7. A storage case for preserving fishing rods and reels comprising: (a) a bottom panel, a top panel, side walls, a rear wall and a front wall forming a housing; (b) an opening formed between a front edge of the top panel and a top edge of the front wall; (c) said opening providing access to an interior space of the housing; a cover that engages said housing to seal said opening; (d) an active dehumidifier located within said housing, said dehumidifier in fluid communication with a water collection system; (e) at least one aperture located between the cover and the top panel to allow an upper portion of a fishing rod to extend out of the housing while a lower portion of the fishing rod remains sealed within the housing when the cover is in a closed position; and (f) at least one gasket located between the cover and the housing forming a substantially air-tight seal between the fishing rod and the cover.

8. The storage case of claim 7 wherein:
said cover is L-shaped.

9. The storage case of claim 7 wherein:
said cover is hingedly attached to said top edge of the front wall.

10. The storage case of claim 7 wherein:
said at least one aperture is fanned by a cutout located on a front edge of said top panel and a corresponding cutout located on a rear edge of said cover.

11. The storage case of claim 10 further comprising:
at least one gasket located between said cutout located on said front edge of said top panel and said corresponding cutout located on said rear edge of said cover.

12. A storage case for preserving fishing rods and reels comprising: (a) a bottom panel, a top panel, side walls, a rear wall and a front wall fanning a housing; (b) an opening formed between a front edge of the top panel and a top edge of the front wall; (c) said opening providing access to an interior space of the housing; a cover that engages said housing to seal said opening; (d) an active dehumidifier located within said housing; (e) at least one aperture located between the cover and the top panel to allow an upper portion of a fishing rod to extend out of the housing while a lower portion of the fishing rod remains sealed within the housing when the cover is in a closed position; (f) said at least one aperture is formed by a cutout located on a front edge of said top panel and a corresponding cutout located on a rear edge of said cover; and (g) at least one gasket located between the cover and the housing forming a substantially air-tight seal between the fishing rod and the cover.

13. The storage case of claim 12 further comprising:
at least one gasket located between said cutout located on said front edge of said top panel and said corresponding cutout located on said rear edge of said cover.

14. The storage case of claim 13 wherein: said cover is L-shaped.

15. The storage case of claim 13 wherein:
said cover is hingedly attached to said top edge of the front wall.

* * * * *